United States Patent [19]

Hartung et al.

[11] Patent Number: 5,481,308
[45] Date of Patent: Jan. 2, 1996

[54] METHOD AND APPARATUS FOR SYNTHESIZING SUBBAND VIDEO IMAGES

[75] Inventors: John Hartung, Warren, N.J.; Arnaud E. Jacquin, New York, N.Y.; Thomas A. Michel, Watchung; Christine I. Podilchuk, Bridgewater, both of N.J.

[73] Assignee: AT&T Corp., Murray Hill, N.J.

[21] Appl. No.: 405,426

[22] Filed: Mar. 15, 1995

Related U.S. Application Data

[60] Continuation of Ser. No. 179,858, Jan. 11, 1994, abandoned, which is a division of Ser. No. 92,768, Jul. 16, 1993, Pat. No. 5,309,232, which is a continuation of Ser. No. 832,256, Feb. 7, 1992, abandoned.

[51] Int. Cl.$^6$ ............................................ H04N 7/24
[52] U.S. Cl. ............................................ 348/398
[58] Field of Search ................................. 348/398, 397, 348/390, 415, 409

[56] References Cited

U.S. PATENT DOCUMENTS

| | | | |
|---|---|---|---|
| 4,751,742 | 6/1988 | Meeker | 382/41 |
| 4,943,855 | 7/1990 | Bheda et al. | 348/398 |
| 4,969,040 | 11/1990 | Gharavi | 348/398 |
| 5,063,444 | 11/1991 | Knauer et al. | 348/398 |
| 5,067,015 | 11/1991 | Combridge et al. | 348/398 |
| 5,136,374 | 8/1992 | Jayant et al. | 348/398 |
| 5,202,760 | 4/1993 | Tourtier et al. | 348/398 |

FOREIGN PATENT DOCUMENTS 0396368  4/1990  European Pat. Off. .

OTHER PUBLICATIONS

H. M. Hang et al., "Digital HDTV Compression Using Parallel Motion–Compensated Transform Coders," *IEEE Transactions On Circuits And Systems For Video Technology*, vol. 1, No. 2, New York, Jun. 1991, pp. 210–221.

G. Karlsson et al., "Three Dimensional Sub–Band Coding Of Video," *ICASSP* '88, New York, Apr. 1988, pp. 1100–1103.

P. H. Westerink et al., "An Optimal Bit Allocation Algorithm For Sub–Band Coding," *ICASSP* '88, New York, Apr. 1988, pp. 757–760.

T. A. Welch, "A Technique for High–Performance Data Compression," *Computer*, 8–19 (Jun. 1984).

G. Karlsson and M. Vetterli, "Three Dimensional Sub–Band Coding of Video," *IEEE*, 1100–1103 (1988).

J. D. Johnston, "A Filter Family Designed for Use in Quadrature Mirror Filter Banks," *IEEE*, 291–294 (1980).

A. J. DeGroot et al., "Image Processing Using the SPRINT Multiprocessor," *IEEE*, 173–176 (1989).

K–M. Yang et al., "Hardware Design of a Motion Video Decoder for 1–1.5 Mbps Rate Applications," *Signal Processing:Image Communications*, vol. 2, 117–126 (1990).

J. R. Parker and T. R. Ingoldsby, "Design and Analysis of a Multiprocessor for Image Processing," *Journal of Parallel and Distributed Computing*, vol. 9, 297–303 (1990).

(List continued on next page.)

*Primary Examiner*—Tommy P. Chin
*Assistant Examiner*—Bryan S. Tung
*Attorney, Agent, or Firm*—Thomas A. Restaino; Kenneth M. Brown

[57] ABSTRACT

A method of coding a set of multi- level signals, such as video signals comprises filtering the set of multi-level signals into one or more sets of multi-level sub-band signals; allocating a first quantity of bits for use in coding a first set of sub-band signals; coding the first set of multi-level sub-band signals using zero or more of the first quantity of allocated bits; allocating a second quantity of bits for use in coding a second set of sub-band signals, the second quantity of bits comprising zero or more of the first quantity of bits not used in coding the first set of multi-level sub-band signals; and coding the second set of multi-level sub-band signals using zero or more of the second quantity of allocated bits. Three examples of the method am provided. A hardware implementation involving the use of digital signal processors operating in parallel is also provided.

2 Claims, 5 Drawing Sheets

OTHER PUBLICATIONS

C. Hoek et al., "An Array Processor Approach for Low Bit Rate Video Coding," *Signal Processing:Image Communication*, vol. 1, 213–223 (1989).

T–C. Chen and P. E. Fleischer, "Sub–Band Coding for ATV Signals Based on Spatial Domain Consideration," *SPIE* vol. 1199 Visual Communications and Image Processing IV, 787–798 (1989).

K–K. Ma and S. A. Rajala, "Subband Coding of Digital Images Using Absolute Moment Block Truncation," *IEEE* 2645–2648 (1991).

D. Le Gall and A. Tabatabai, "Sub–Band Coding of Digital Images Using Symmetric Short Kernel Filters and Arithmetic Coding Techniques," *IEEE*, 761–764 (1988).

M. J. T. Smith and S. L. Eddins, "Analysis/Synthesis Techniques for Subband Iamge Coding," *IEEE Transactions on Acoustics, Speech, and Signal Processing*, vol. 18, No. 8, 1446–1456 (Aug. 1990).

J. W. Woods and S. D. O'Neil, "Subband Coding of Images," *IEEE Transactions on Acoustics, Speech and Signal Processing*, vol. ASSP–34, No. 5, 1278–1288 (Oct. 1986).

M. Vetterli, "Multi–Dimensional Sub–Band Coding: Some Theory and Algorithms," *Signal Processing*, vol. 6, 97–112 (1984).

T. A. Ramstad, "Sub–Band Coder with a Simple Adaptive Bit–Allocation Algorithm A Possible Candidate for Digital Mobile Telephony:," *IEEE* (1982).

C. I. Podilchuk et al., "Sparse Codebooks for the Quantization of Non–Dominant Sub–Bands in Image Coding," *IEEE*, 2101–2104 (1990).

METHOD AND APPARATUS FOR SYNTHESIZING SUBBAND VIDEO IMAGES

CROSS-REFERENCE TO RELATED APPLICATION

This application is a continuation-in-part of application Ser. No. 08/179,858, filed on Jan. 11, 1994 which is a Divisional of Ser. No. 08/092,768 filed Jul. 16, 1993 now U.S. Pat. No. 5,309,232, which was a continuation application under 37 CFR 1.62 of commonly assigned U.S. patent application Ser. No. 07/832,256, filed Feb. 7, 1992, abandoned.

FIELD OF THE INVENTION

This invention relates to the efficient digital coding of multi-valued signals, and more particularly, to the digital coding of video signals at low rates where the rate is fixed for each video frame.

BACKGROUND OF THE INVENTION

Good quality, low bit rate video coding is required for such applications as teleconferencing over existing and future networks, as well as CD-ROM storage. An effective low rate coder should remove the redundancies due to temporal and spatial correlations along with perceptually irrelevant components of an image sequence.

Subband digital coding techniques are well known in the art. See, e.g., N. S. Jayant and P. Noll, Digital Coding of Waveforms: Principles and Applications to Speech and Video (1984).

Subband coding techniques have been used for image coding in a three-dimensional spatio-temporal subband framework as described in G. Karlsson and M. Vettefii, *Three Dimensional Subband Coding of Video,* Proceedings ICASSP (1988), 1100–1103. The technique described there employs multidimensional filtering to generate spatio-temporal frequency bands or subbands using so called quadrature mirror filters. These latter filters are described, e.g., in J. D. Johnston, *A Filter Family Designed for Use in Quadrature Mirror Filter Bands,* Proceedings ICASSP (1980).

SUMMARY OF THE INVENTION

The present invention takes advantage of the three-dimensional subband framework in determining a dynamic bit allocation that relies on perceptual criteria of the human visual system. This is done in terms of both the relative significance of individual subbands, and the significance of local spatial areas within such subbands. Three illustrative embodiments of the present invention are described below.

For example, in the first illustrative embodiment of the present invention, an image sequence is separated in different spatio-temporal frequency bands. The temporal correlations are exploited by using conditional replenishment on the subband data between frames. Unless the subband is discarded due to perceptually insignificant information as measured by the low signal energy content in the subband, conditional replenishment is applied to the data either on a pixel or block basis. The subband corresponding to the lowest spatio-temporal frequency components needs to be encoded accurately due to the high signal energy present in the subband and its perceptual significance for video data. The lowest spatiotemporal frequency band is quantizod using PCM with a uniform quantizer.

The perceptually significant upper subbands as measured by their overall signal energy are encoded either by Geometric Vector Quantization (described in commonly assigned U.S. patent application Ser. No. 07/503,659, entitled "Geometric Vector Quantization", filed Apr. 3, 1990, and in commonly assigned U.S. patent application Ser. No. 07/832,536, entitled "Geometric Vector Quantization", filed on even date herewith, which are hereby incorporated by reference as if fully set forth herein) or by conventional PCM using a uniform quantizer.

The areas of the significant upper frequency subbands which are to be encoded are chosen by using the adaptive bit allocation scheme of the present invention.

DETAILED DESCRIPTION

A. A First Illustrative Embodiment

Figure 1:
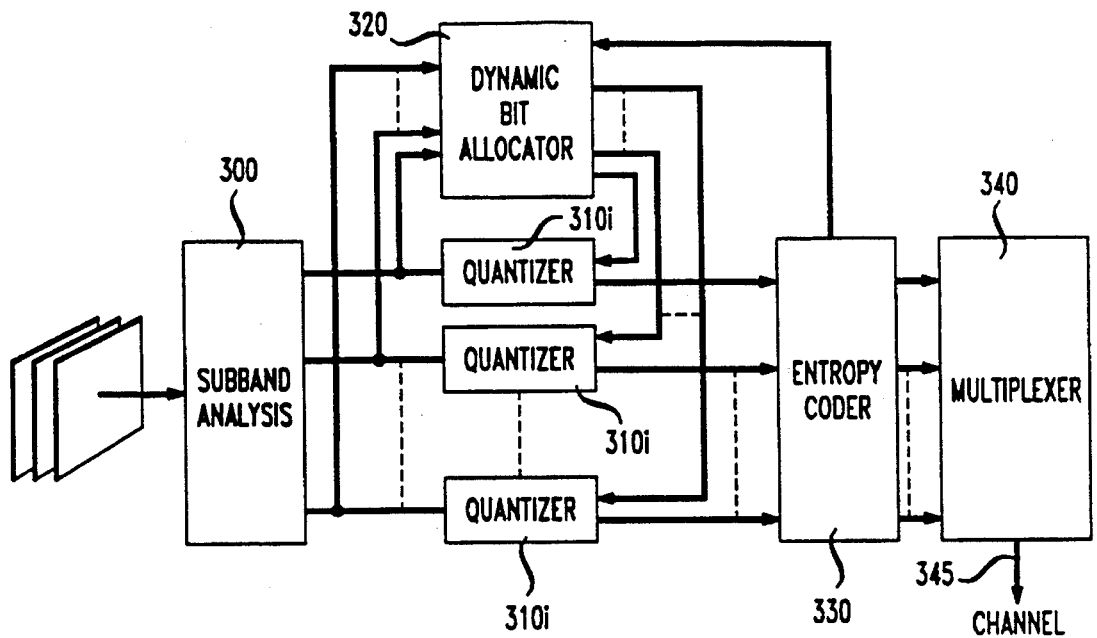
FIGS. 1 and 2 present a first illustrative embodiment of the present invention comprising digital image coder and decoder, respectively.
Figure 2:
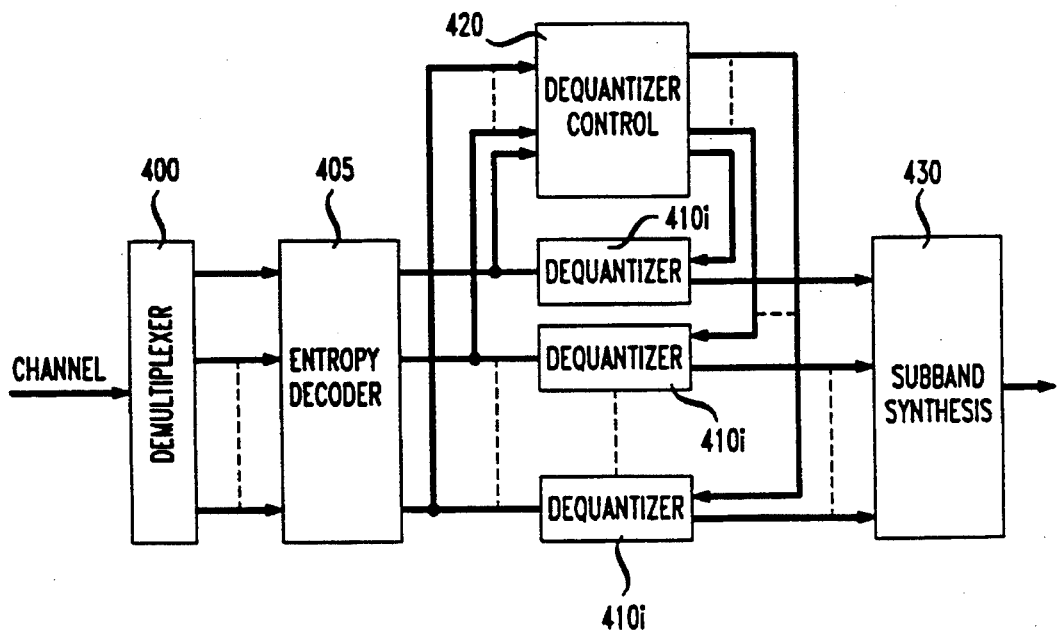

FIGS. 1 and 2 present a first illustrative embodiment of the present invention.

FIG. 1 shows an image encoder which employs the adaptive bit allocation of the present invention together with conditional replenishment and quantization based on PCM with a uniform quantizer or Geometric Vector Quantization. Similarly, FIG. 2 shows an image decoder based on the same inventive techniques. Each of the system elements will now be described individually.

FIG. 1 shows a representation of a graphical image, e.g., sequential frames of a video image. Since the subband filtering used in this illustrative image coding application uses 2 taps for the temporal filtering, it proves convenient to store two successive frames of the input signal in block 300. As a specific example, each frame of the image contains 240×360 pixels which is known as the Common Intermediate Format (CIF). For present purposes, the image will be considered to be a multi-level image having up to 256 possible intensity levels. Color images are amenable to coding using the present inventive techniques.

Figure 3:
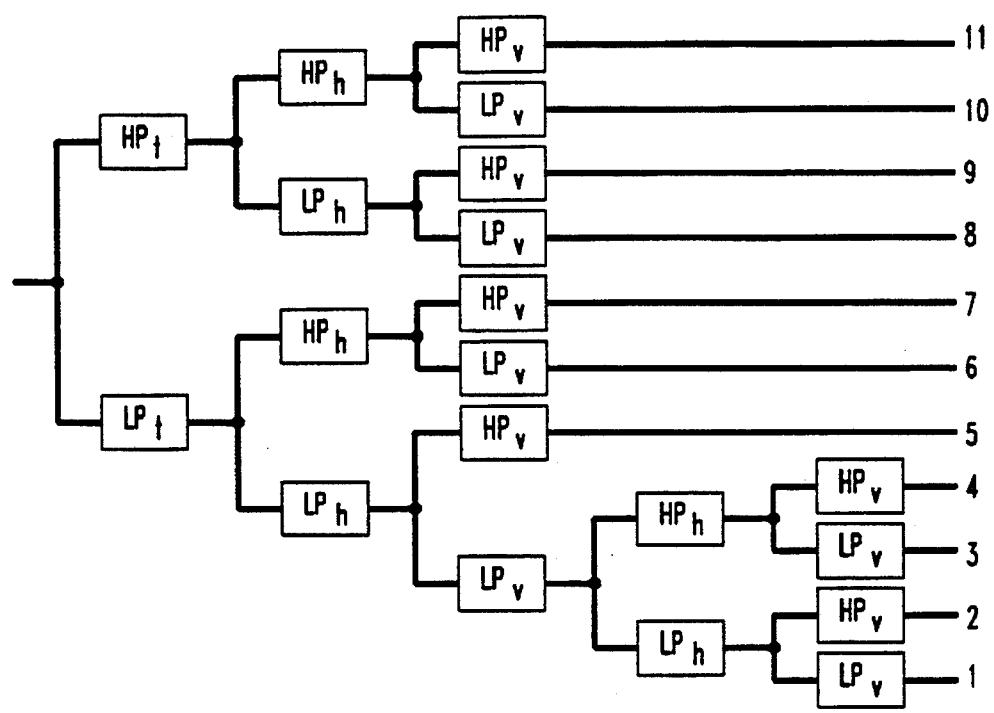
FIG. 3 shows a typical subband filter arrangement in accordance with one aspect of the present invention.

Referring to FIG. 1, successive frames of a video image are applied to the subband analysis filter block 300 (presented in greater detail in FIG. 3). There, the spatio-temporal frequency components of the image are generated using 2-tap Haar filters for the temporal filtering and 10-tap one-dimensional quadrature mirror filters (QMFs), of the type described in J. D. Johnston, *A Filter Family Designed for Use in Quadrature Mirror Filter Banks*, Proceedings ICASSP (1980), for the spatial filtering. In a typical embodiment of the present invention, the subband framework consists of 11 spatio-temporal frequency bands, as shown in FIG 3. Except for the particular choice of subband filters, this is the same basic structure as used in G. Karlsson and M. Vetterli, *Three-Dimensional Subband Coding of Video*, Proceedings ICASSP (1988). The terms HP and LP refer to high-pass filtering and low-pass filtering respectively while the subscripts t,h, and v refer to temporal, horizontal and vertical filtering respectively. The subbands whose signal energy content is typically low are discarded without causing severe degradation in the reconstructed image sequence. The remaining subbands are encoded using conditional replenishment to take advantage of the temporal correlation and either PCM with a uniform quantizer (such as that described by Jayant and Noll, *Digital Coding of Waveforms: Principles and Applications to Speech and Video* (1984)), or Geometric Vector Quantization, (such as that described in the patent application incorporated by reference).

The highest spatio-temporal frequency subbands are discarded due to their general perceptual insignificance. For the particular scheme described here, the subbands labeled 9 through 11 in FIG. 3 are discarded without causing severe image quality distortion. In general, depending on the bit rate, quality sought, and subband framework, any number of high frequency subbands may be discarded.

The significant subbands are encoded using either a scalar quantizer or Geometric Vector Quantization shown as blocks 310$i$ in HG. 1.

The dynamic bit allocation is represented by block 320 in FIG 1. The bit allocation depends on the amount of conditional replenishment and the amount of motion data as determined by the signal energy in the appropriate subband.

Conditional replenishment is applied to all of the significant subbands and is part of dynamic bit allocation block 320. Conditional replenishment is performed on a pixel basis in the subbands using a scalar quantizer, and on a block basis in the subbands using Geometric Vector Quantization. The block size corresponds to the block size used in the vector quantization scheme under consideration. Conditional replenishment on a pixel basis is described by the following expression:

$$\hat{x}(i,j,t) = \begin{cases} \hat{x}(i,j,t-1) & \text{if } |x(i,j,t) - x(i,j,t-1)| \leq T_{cr} \\ Q\{x(i,j,t)\} & \text{otherwise} \end{cases} \quad (1)$$

where $x(i,j,t)$ is the original pixel value in the ith row, jth column and time t, and $\hat{x}(i,j,t)$ is the quantized pixel value in the ith row, jth column and time t. Q· represents quantization of the term in the bracket while $T_{cr}$ is an empirically derived conditional replenishment scalar threshold. The choice for $T_{cr}$ determines how much of the subband data will be repeated from the previously encoded subbands. As an example for some typical video sequences, we have found a good choice for $T_{cr}$ to be between 10 and 25. Performing conditional replenishment on a block basis is similar to the pixel-based approach except that the condition in Eq. (1) must hold for all the pixels in a block of data; otherwise the block must be quantized and transmitted.

After conditional replenishment is performed on the subbands with significant information, the side information indicating which pixels are repeated from the previous frame and which pixels are quantized is sent to block 330, the entropy coder, to be encoded. The entropy coder may be any lossless coding technique and for this example is the adaptive Lempel-Ziv algorithm. See, e.g., T. A. Welch, *A Technique for High Performance Data Compression*, IEEE Computer (1988). The number of bits that the entropy coder of block 330 in FIG. 1 needs to encode the conditional replenishment side—information is fed to the Dynamic Bit Allocation block 320 to update the number of bits available to encode the subband data. After entropy coding, the image signal is then multiplexed onto communication channel 345 for transmission to a decoder (see discussion below).

The dynamic bit allocation technique has two significant parts. The first part is the ordering of the subbands based on their perceptual significance. In this regard, the lowest spatio-temporal frequency band is treated as the most significant in that it contains the most signal energy and most of the original image structure. This band is very accurately encoded. The next most significant subband is the motion subband (corresponding to subband 8 in FIG. 3). This subband is given enough bits to encode the motion information. The remaining bits are used to encode the high spatial-low temporal frequency subbands (corresponding to subbands 2–7 in FIG. 3). When the motion information is high, more bits are given to the motion subband and fewer are left to encode the high spatial details. The high motion activity should mask the loss in high spatial details. When the motion activity drops, more bits are left to encode the high spatial details which now become visible.

The second part of the dynamic bit allocation is to locate the significant perceptually areas of the image to encode. This is done across all the subbands by choosing the blocks with the highest average energy to encode.

Because the lowest spario-temporal frequency subband (subband 1) includes much of the basic image structure and most of the signal energy, it is important to accurately encode this subband. Therefore the present embodiment first encodes the lowest spatio-temporal frequency band using PCM and a uniform quantizer. For a typical image scheme, the uniform quantizer consists of 6–8 bits. If the signal in the lowest frequency subband contains data which possesses a probability density function that is not uniform, PCM is applied with a quantizer that suits the probability density function of the signal. Applying a quantizer suited to a signal's probability density function is a conventional technique and is described, e.g., in the above-cited Jayant and Noll reference. The number of bits needed to encode the lowest spatio-temporal frequency band using PCM and a uniform quantizer is fed into block 320—Dynamic Bit Allocation—to update the number of bits available to encode the high spatio-temporal frequency bands.

The next band that is encoded corresponds to the subband containing high temporal frequency components and low spatial frequency components. For the example presented in the framework illustrated in FIG. 3, this corresponds to subband 8. This frequency subband contains much of the motion information of the video signal. The signal energy in this subband gives a good indication of the amount of motion in the video sequence at any given time. Subband 8 is encoded by quantizing the data in the blocks whose local energy exceeds a predetermined threshold value as given by:

$$\frac{1}{N} \sum_{i,j} x(i,j,t)^2 \geq T_m, \quad (2)$$

where the summation is performed over the block of data, N denotes the block size and $T_m$ is a predetermined scalar motion threshold value. For this example, a good value for $T_m$ is 100. The blocks in the motion subband whose average energy exceeds the threshold $T_m$ are encoded using Geometric Vector Quantization with either 2 or 3 levels (described in the above-referenced U.S. patent application Ser. No. 07/503,659). The amount of bits that are required to encode the motion data accurately is fed back to block 320—Dynamic Bit allocation—to update the number of bits left to encode the remaining subbands.

The subbands which are encoded last, correspond to the low temporal frequency components and high spatial frequency components. For the example framework illustrated in FIG. 3, this corresponds to the subbands labeled 2 through 7. The bits which are left to encode subbands 2–7 are distributed to the blocks across all the remaining subbands with the largest local energy as defined in Eq. 2. The blocks may be encoded using Geometric Vector Quantization. Any of these remaining blocks, especially those corresponding to lower spatial frequencies (such as subbands 2–4 in FIG.3), may be encoded using the scalar quantizer described for the lowest spatio—temporal frequency band. In this case, the pixels with the largest absolute value are encoded.

FIG. 2 shows a decoder counterpart to the coder in FIG. 1. Coded signals received from the channel are first demultiplexed in unit 400. Side information is used by the dequantizer control unit 420 to determine which areas of the subbands have been repeated from the previously encoded subband as given by conditional replenishment, which areas have been quantized, and which areas have been zeroed out. The dequantizer units labeled 410$i$ reconstruct the data from the vector indices and magnitude information as provided by the Geometric Vector Quantizer. The subband synthesis unit 430 performs the operations of the subband analysis unit 300 in reverse to reconstruct the images.

The above embodiment can be adapted to other frameworks besides the one illustrated in FIG. 3 allowing for a greater control over which subbands are perceptually most significant and which areas of the image are perceptually most significant.

B. A Second Illustrative Embodiment

A second illustrative embodiment of the present invention codes video frame sequences at a maximum constrained bit rate. This embodiment provides coded video to be transmitted or stored on a medium with a specified constant or time varying bit rate.

1. The Coder

Figure 4:
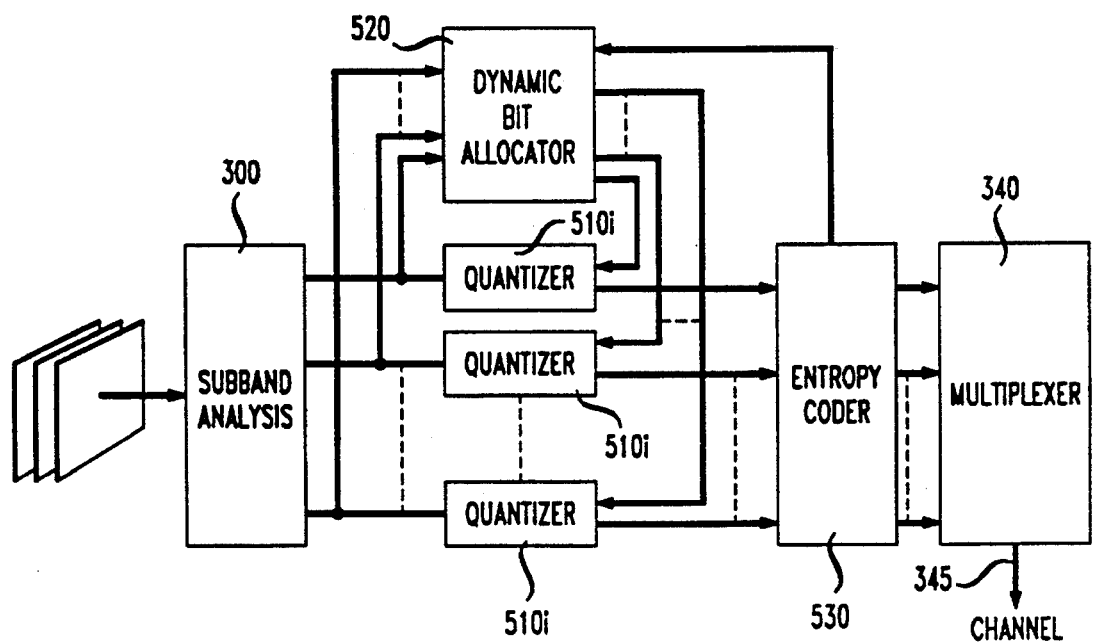
FIGS. 4 and 5 present a second illustrative embodiment of the present invention comprising digital image coder and decoder, respectively.

FIG. 4 presents an embodiment of the video coder according to the present invention. An input video image sequence is decomposed into temporal and spatial subbands by the subband analysis filter block 300. The subband structure is the same as that shown in FIG. 4 of the above-referenced patent application Ser. No. 07/503,659. The outputs of the subband filters are critically sampled, and bands 7, 9, 10, and 11 are set to zero. The decomposed video sequence, therefore, contains half the number of samples as the original input image sequence. The zeroed bands typically contain very low energy, therefore, zeroing these bands introduces very little degradation in the reconstructed video sequence. Two-tap temporal filters are used to minimize delay, and tenth-order quadrature mirror filters are used for the spatial decomposition. Although the present embodiment is described only for the luminance component of a color video sequence, the same advantages result when the present invention is applied to the chrominance components of a color sequence.

The decomposition by filter block 300 produces subbands with reduced spatial redundancy. However, temporal redundancy within the lower temporal subbands and spatial correlations between the subbands remain. The technique of conditional replenishment is used to remove temporal redundancy from the coded signal, thereby achieving higher decoded video quality at a specified coding rate. Subband correlation may be taken advantage of by dequantizer blocks 610$i$ and dequantizer control block 620 to further improve the quality of the decoded video.

During peak motion of objects in a video signal, the available coding rate may be insufficient to code all of the perceptually significant subband samples. Therefore, this embodiment allocates coding bits within and among the subbands to minimize the perceived coding distortion. Quantization errors are most noticeable in subband 1 because it contains most of the basic image structure, and in band 8 for moving areas of the video sequence.

Figure 6:
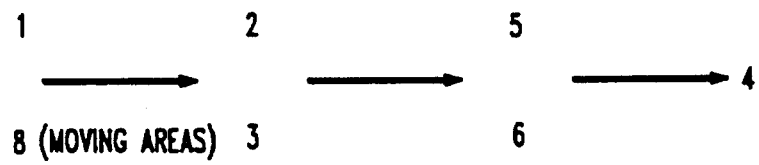
FIG. 6 presents subbands arranged in order of perceived visibility of errors.

Samples in bands 1, 2, 3, and 4 are subsampled by an additional factor of 2 beyond that of the other bands. Quantization errors in these bands are more visible than those in the higher spatial bands because these samples are spatially interpolated by an additional factor during reconstruction, and therefore sample errors occupy a larger area in the decoded video frame. Band 4 usually has very low energy, therefore it is perceptually less significant than bands 5 and 6 for typical video sequences. FIG. 6 shows the subbands arranged in order of the perceived visibility of errors.

Figure 7:
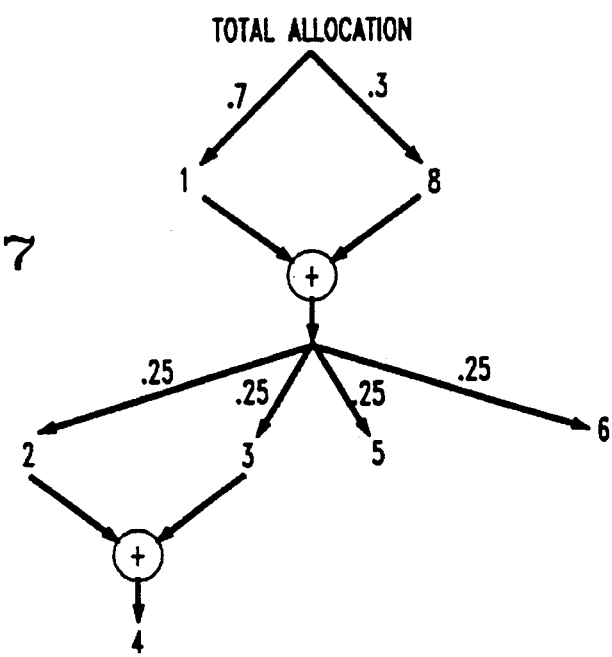
FIG. 7 presents a graph illustrating bit allocation as carried out by a bit allocation block.

This ordering is used to determine the priority of allocating available bandwidth to each subband quantizer block 310$i$. Bandwidth or bit allocation is implemented by dynamic bit allocation block 520. Because the bandwidth required to code different bands is correlated, a fixed proportion of the remaining bandwidth may be allocated to the subbands at each stage of allocation. These proportions have been determined empirically. FIG. 7 presents a graph illustrating bit allocation as carried out by block 520. Each node of the graph corresponds to one of the subbands, and each edge is labeled with the proportion of bits remaining from the preceding subband which are allocated to the lower subband node.

The bits remaining after quantizing bands 1 and 8 are allocated equally to subbands 2, 3, 5, and 6. Although equal bandwidth is allocated to the lower priority bands, 5 and 6, fewer bits per sample are allocated to these bands since they contain more samples. The advantage in allocating bits in this fashion is that the quantizers for bands 1 and 8, and the quantizers for bands 2, 3, 5, and 6 can be implemented in parallel, yielding greater efficiency in operation.

Temporal redundancy in bands 1, 2, 3, 4, 5, and 6 is removed by selectively repeating subband samples which differ by less than a determined threshold from the corresponding previously transmitted value. This technique is referred to as conditional replenishment, and has been described above with reference to the first illustrative embodiment. Conditional replenishment is applied in the subband analysis framework. An advantage is obtained by allocating bandwidth for replenishment on a priority basis to those subbands which have the highest visibility. This results in a perceptually improved decoded quality.

In order to determine which subband samples should be repeated, the magnitude difference between the subband samples being quantized and the corresponding samples of a previously quantized video frame is calculated. Each quantizer block 510$i$ includes a memory which contains the previously quantized subband samples. Since the samples are represented with a linear eight-bit code, the error magnitude is in the range (0, 256). A histogram of the occurrence of the error values is efficiently generated by the quantizer 310$i$ using the error value, for each sample in the subband, as an address into one of 256 memory locations which are incremented for each occurrence of the corresponding error value. A coding error threshold is determined from the histogram by summing the number of occurrences for each error value, starting with the largest error and proceeding towards the lowest error, until the bandwidth needed to quantize the number of samples indicated by that sum equals the coding bandwidth available. The address of the location being accessed when the summation is terminated is equal to the coding error threshold. The threshold is limited to be greater than an error which is not visible in the decoded video sequence. This minimum value has been empirically determined to be three (3) for subbands 1, 2, and 3. Samples which have an error greater than the determined threshold are coded and transmitted to the decoder as described below. The locations of samples which are below the threshold are efficiently coded using run-length coding, and entropy coding, e.g., Huffman coding, of the run-lengths, implemented by entropy coder 530. Excess bits are available to be allocated to lower priority subbands when the error threshold determined by the histogram method falls below the minimum visibility threshold.

Sample values which are transmitted in bands 1, 2, 3, and 4 are coded using a scalar quantizer. Sample values which are transmitted in bands 5 and 6 are coded using a scalar or vector quantizer, and in particular the geometric vector quantizer described in the above-referenced and incorporated patent applications. The determination to use the scalar or vector quantizer is made by applying a threshold to the bandwidth allocated to subbands 5 and 6. An allocation below an empirically determined threshold indicates a high degree of motion in the video sequence. It has been empirically determined that perceived distortion is minimized when the vector quantizer is used for a bandwidth allocation falling below 60 percent of the maximum allocation. An advantage is achieved by this method because the distortion introduced by the vector quantizer is masked by motion in the video sequence. This allows a larger number of samples to be coded due to the higher efficiency of this quantizer. When the bandwidth allocation increases above the threshold, and therefore the degree of masking afforded by motion in the video sequence decreases, the scalar quantizer is used to reduce the errors introduced by the vector quantizer.

2. Geometric Vector Quantization

This section describes an efficient implementation of the geometric vector quantizer used in subbands 5, 6, and 8. This implementation provides a means for constraining the bandwidth necessary to code the given subband, and provides an efficient technique to search for null vectors.

Null vectors correspond to repeated samples in bands 5 and 6, and refer to zero valued samples in band 8. The geometric vector codebook described in patent application Ser. No. 07/503,659 requires approximately equal o complexity to identify both null and non-null vectors. Because the majority of subband samples typically are coded as the null vector, a significant reduction in vector search complexity may be achieved by an efficient null vector search technique. Null vectors may be identified by first determining the sample in each vector having the greatest magnitude, for band 8, or the greatest magnitude difference, for bands 5 and 6, where conditional replenishment is used. A coding threshold is determined by the histogram method described above, using the maximum magnitudes, for band 8, or maximum difference magnitudes, for bands 5 and 6. Those vectors having a maximum magnitude falling below the coding threshold are identified as null vectors. The remaining vectors are coded using the efficient codebook search techniques described in the above referenced and incorporated patent applications. The location of null vectors is coded using runlength coding and entropy coding, e.g., Huffman coding, of the ran-lengths. The coding threshold in band 8 is limited to a minimum value of 6. If the coding value is determined to be less than 6 by the histogram method, excess coding bandwidth is available to allocate to the lower priority bands.

The transmitted sample values are written into the corresponding locations in each subband sample memory in the quantizer blocks 510i. The channel multiplexer block 340 formats the information from the quantizer blocks 510i so that it can be transmitted or stored on the appropriate medium. This information includes the run-length encoded repeated sample locations and the transmitted quantized samples. Side information is provided for bands 5 and 6 to specify whether scalar or vector quantization was used in the encoding process.

3. The Decoder

Figure 5:
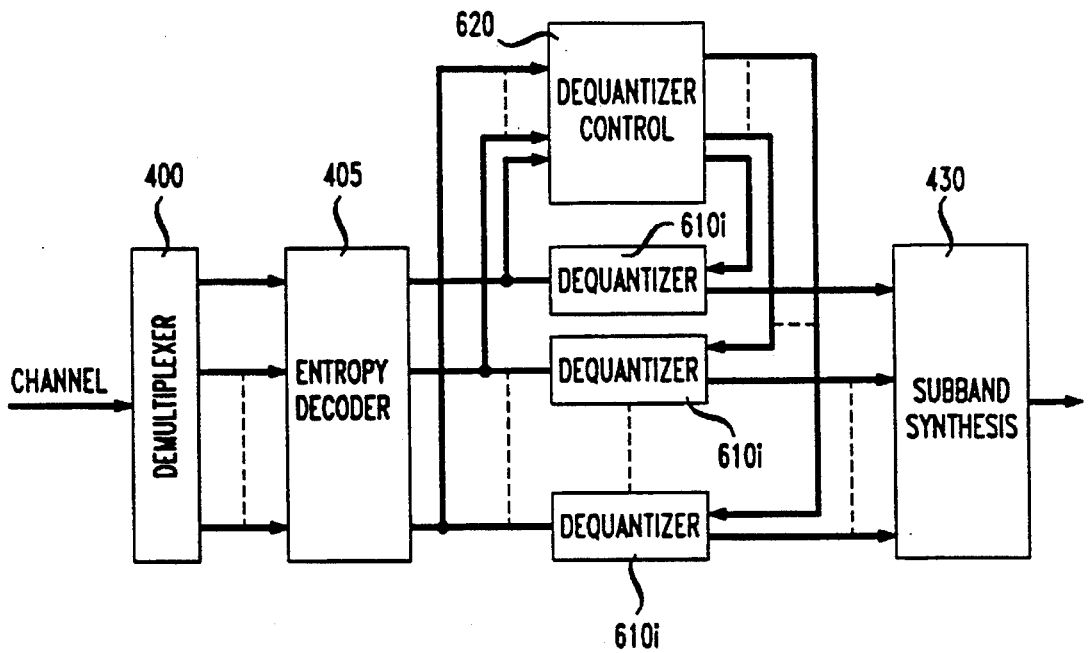

FIG. 5 presents an embodiment of the decoder according to the present invention. The channel demultiplexer block 400 operates in reciprocal fashion to multiplexer 340 in FIG. 4 to separate the coded subband information. This information is provided to the dequantizer blocks 610i for each subband. For the case of vector quantization in bands 5, 6, and 8, the dequantizers reconstruct the vector samples as described in U.S. patent application Ser. No. 07/503,659. The remaining samples in band 8 are set to zero. The dequantizer blocks 610i, corresponding to subbands 1, 2, 3, 4, 5, and 6, include memories containing the previously dequantized subband samples. Samples which are quantized and transmitted by the encoder replace the corresponding samples in these subband memories; the remaining samples are repeated. The difference between the transmitted samples and previously stored samples, for subband 1, are calculated and stored for use as described below.

The selective modification of the subband samples in the decoder improves the perceived quality of the reconstructed video signal. This is accomplished by dequantizer blocks 610i and dequantizer control block 620 as follows. Objectionable errors in the decoded video sequence may occur when the coding rate is constrained such that there is insufficient bandwidth to transmit all of the subband samples with errors above a perceptible threshold. Under this condition, the decoder subbands using conditional replenishment contain three types of samples: (i) low error samples which are repeated, (ii) newly received samples, and (iii) large error samples which cause objectionable artifacts in the decoded video sequence. These large errors occur most frequently in the subbands with lower bandwidth allocation priority. The errors typically appear as edges which remain behind moving objects.

Quantization errors in subband 1 remain small since it has the highest bandwidth allocation priority. This fact, along with the spatial correlation between the subbands, is used to identify samples in the upper subbands which have a large error. The technique compares the band 1 difference signal, described above, to an empirically determined threshold. A useful threshold value is 12 for the range of intensity values in band 1 is (0, 256). If the difference is greater than the threshold, the corresponding spatial samples in subbands 2, 3, 4, 5, and 6 are tested further.

Each sample in subband 1 corresponds to four samples in subbands 5 and 6 since subband 1 is decimated by an additional factor of two in the analysis filters 300. If the corresponding upper subband samples have not been transmitted by the encoder, they are assumed to have large error and are processed further to reduce the resultant distortion. A useful technique is to set these samples to zero in order to eliminate trailing edges on moving areas. Other techniques, such as interpolating these samples between low error samples, may prove advantageous in smooth areas of the image. This technique provides an advantage by reducing perceived coding distortion without transmitting additional side information to the decoder.

The resulting subband samples are finally applied to the subband synthesis block 430, which reconstructs the sequence of video frames.

An illustrative hardware architecture for a real-time implementation of the present invention is presented in the Appendix.

C. A Third Illustrative Embodiment

Figure 8:
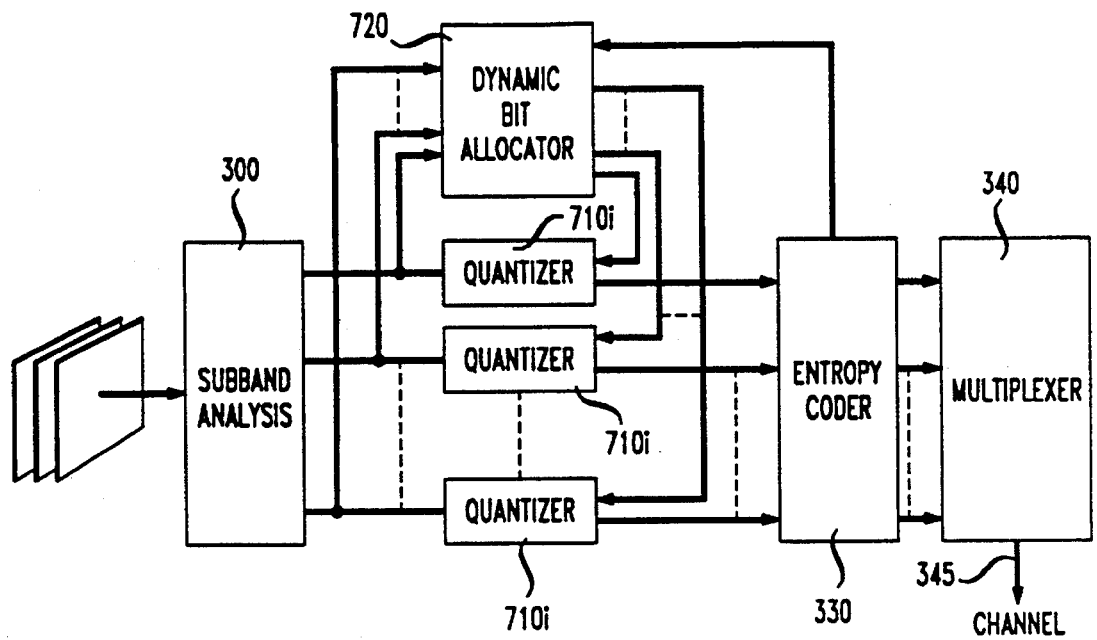
FIG. 8 presents a third illustrative embodiment of the present invention comprising an image coder.

The overall structure of the encoder of this embodiment is presented in FIG. 8. A series of video frames are fed into a sub-band analysis filterbank 300 which divides the frequency spectrum into sub-bands. The output of the sub-band analysis is used by a dynamic bit allocator 720. The dynamic bit allocator 720 is responsible for deciding how much of the total available bit rate should be allocated to each sub-band. The dynamic bit allocator 720 also determines which spatial regions are more important to code within each sub-band. This information, along with the output of the sub-band analysis 300, is provided to the quantizers 710$i$. Under certain circumstances, feedback from the entropy coder 330 may be needed to determine the exact bit rate required to code some of the sub-bands. The resulting bit stream is multiplexed 340 and transmitted over a channel 345. The dynamic bit allocator 720 assumes that there is a fixed rate available as each frame enters the system, although that rate could change when the next frame enters.

A coding advantage can be achieved by dividing the sub-bands into regions and allocating more bits to regions that are deemed to be perceptually more relevant. The definition of perceptual relevance may vary for different applications. A convenient method for determining perceptually relevant regions is to divide the high-pass temporal, low-pass spatial sub-band (sub-band 8 in FIG. 9) into blocks and to compute the energy in each block using, $$e_{k,l,t} = \sum_{i,j} x_{i,j,t}^2$$

where $x_{i,j,t}$ represents the intensity value of a pixel at column i, row j, at time instant t. The computed energy values for each block, $e_{k,l,t}$, are sorted in decreasing order and classified into two or more groups. Illustratively, two classes of blocks are assumed, high energy and low energy. In FIG. 8, the output from the sub-band analysis filterbank 300 is provided to the dynamic bit allocator 720. The dynamic bit allocator 720 is responsible for determining the energy grouping.

Figure 9:
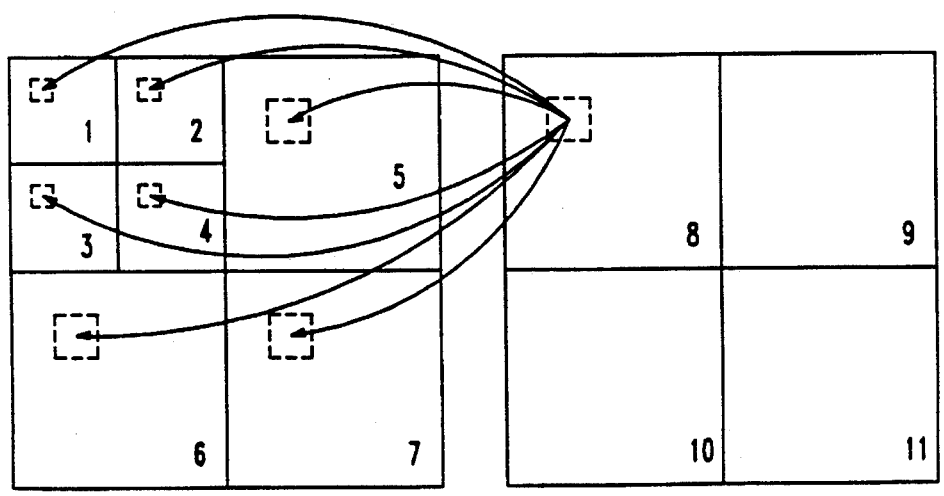
FIG. 9 presents a graphical representation of the subbands including an indication of an illustrative high energy region and a mapping thereof among the subbands.

Once the high and low energy blocks are determined from sub-band 8, this spatial information is used to quantize all of the sub-bands to be coded (FIG. 9). For example, if a block were classified as a high energy block, then the corresponding block could be quantized using a finer quantizer in each of the coded subbands. By preserving higher quality in that block in all of the coded sub-bands, the reconstructed image will have a higher SNR in the corresponding block. This is ideal for an application which requires more spatial detail in moving regions. Such an application might be, e.g., the coding of an image sequence of a person using the American Sign Language (used commonly by deaf people). On the other hand, fewer bits could be allocated to these regions for applications where spatial detail is not needed where motion occurs. There may be any number of high and low energy blocks identified in sub-band 8.

When motion activity is low, sub-band images are not segregated into high and low motion regions. In this case, all the regions of the sub-band image are treated as being equally important. The motion activity is determined by keeping a history of the extrema of total energy in band 8. Illustratively, if the total energy of sub-band 8 for a current frame is within the bottom one-third of the dynamic range of the total energy history of the sub-band, motion activity is considered to be low.

After the high and low energy blocks have been determined, an initial allotment of bits is determined to code each sub-band. A typical initial allotment provides 50% of the total bits to sub-band 1, another 40% to sub-band 8, and the remaining 10% is divided among sub-bands 2–7. The total number of bits is determined by the channel bandwidth and the frame rate.

The embodiment codes sub-band 1 first since sub-band 1 contains a significant portion of the energy in the original signal. Given the initial allotment of bits to code this sub-band, the number of pixels which can be accurately coded is computed by dividing the total number of bits allotted to the sub-band by the number of bits it takes to code each pixel. The number of bits needed to code each pixel is the sum of the bits needed to represent the address, sign, and magnitude of the transmitted pixel. The number of address and sign bits remain fixed within a subband, but the number of bits needed for representing pixel magnitude is determined using an iterative procedure (see FIG. 10).

This procedure begins by computing a histogram of the absolute values of the difference between like-address pixels in the current and previous frames. The maximum value is retained. The histogram is used to determine the threshold value of a dead-zone quantizer. A dead-zone quantizer automatically eliminates coding pixel values which fall below a threshold. Sub-band difference values that are greater than the dead-zone threshold get coded, while those at or below the threshold are not coded but are repeated from the previous frame. The system uses an empirically derived minimum threshold value as an initial estimate of the actual dead-zone threshold. For a channel bit-rate of 384 kbs, illustrative minimum threshold estimates for bands 1–8 are: 3, 4, 4, 5, 5, 5, 5, and 5. The step size for the quantizer is then set to be twice the value of the dead-zone threshold. The maximum amount of distortion that can be introduced by a single uncoded pixel (which falls at or below the threshold) is the threshold value. Since this level of distortion is assumed to be acceptable for pixels which are not coded, the same maximum distortion is allowed on quantized pixels which are coded by setting the step size to twice the dead-zone threshold.

The minimum threshold value is based on experiments which were performed to identify the amount of distortion that can be introduced into each subband before the noise becomes noticeable. The reason a minimum threshold is introduced is to prevent any particular sub-band from being overcoded.

Once the initial dead-zone threshold, step size and maximum absolute difference value have been determined, the number of quantization levels is determined according to the following expression $$\text{num\_levels} = \frac{(\text{max\_val} - \text{threshold})}{\text{step\_size}}$$

Figure 10:
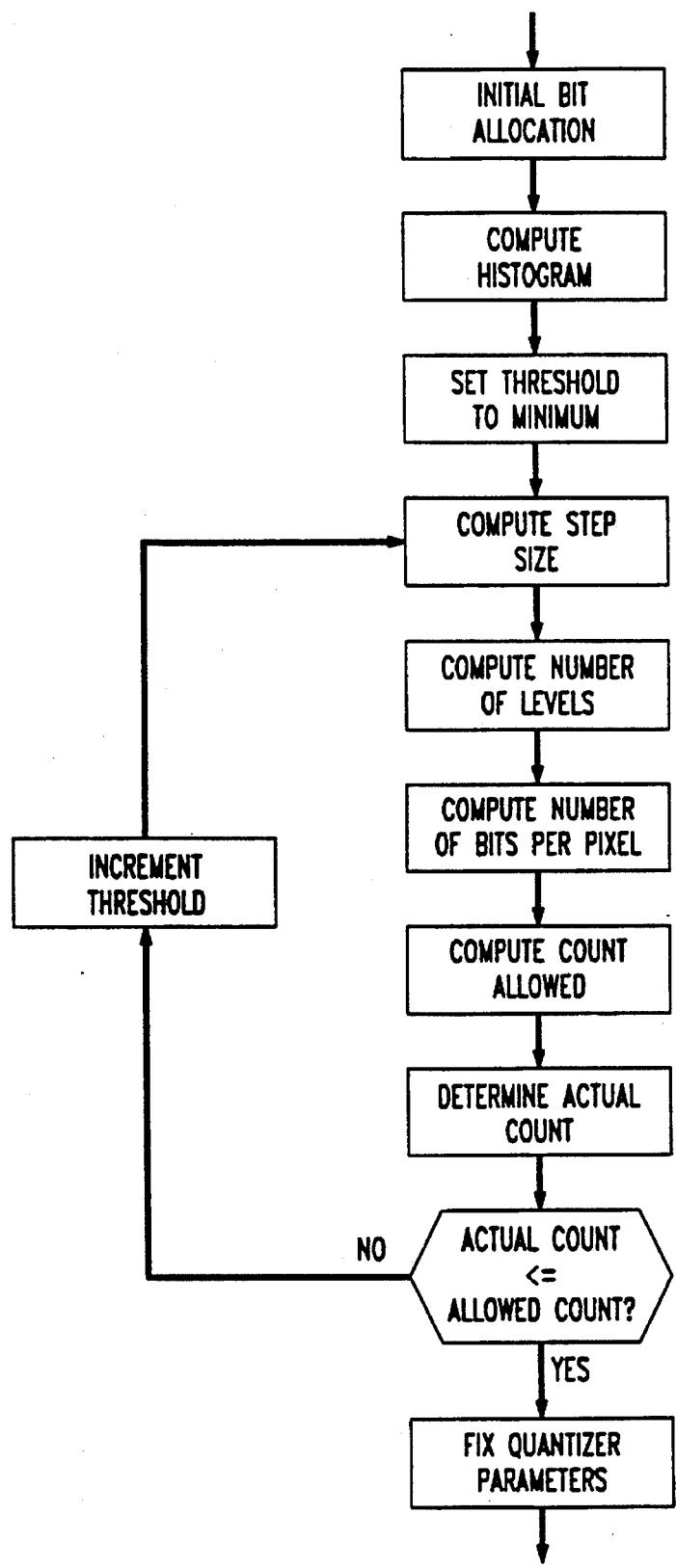
FIG. 10 presents a flowchart of a procedure for determining quantizer parameters.

This value is then rounded up to the nearest power of 2 to cream the greatest number of levels for the bits available. Now the number of bits needed to code a pixel can be evaluated by adding the number of bits needed for the address and sign to the number of bits needed for this quantizer. Dividing the total number of bits by the bits per pixel determines the number of pixels that can be coded within that sub-band region. A count of the number of pixels which fall above the deadzone threshold is computed from the histogram. If this count is less than the allowed count, then the quantizer parameters are fixed. If, however, the count is larger than the allowed count, then the dead-zone threshold is incremented and the computations are repeated as shown in FIG. 10. Increasing the dead-zone threshold forces the step-size to increase since it is set to twice the dead-zone threshold. This, in turn, eventually reduces the number of bits required to quantize the same data, albeit more coarsely. The dead-zone value is incremented until the count of pixels to be coded falls below the number of coded pixels allowed. When this occurs, the quantizer parameters are fixed and provided to the quantizer $710i$.

The quantizer parameters are then used to actually code the sub-band. There may be some bits leftover after coding sub-band 1 if the number of pixels to be coded is less than the number of pixels allowed. This can happen in two circumstances. First, if the minimum dead-zone threshold is used to prevent o overcoding, then the actual count will usually be less than the allowed count. Second, since the histogram uses discrete values, the desired count may not match up exactly with the allowed count. To prevent the system from using more than its allocated bit rate, the value of the dead-zone threshold is incremented until the actual count is less than or equal to the allowed count. Under these two circumstances, any leftover bits are immediately re-allocated to the next sub-band to be coded.

In this case, sub-band 8 is coded next. The exact same procedure is followed for sub-band 8 as was used for sub-band 1, except that the original frame is used rather than the difference between two frames. This method was chosen because of the low correlation between successive frames in sub-band 8. Once again, any leftover bits are passed on to help code subsequent sub-bands.

Once sub-bands 1 and 8 are coded, each of the remaining low-pass temporal sub-bands (sub-bands 2-7) are coded. Two alternative methods for doing this are provided. The first method concerns processing the sub-bands in a perceptually significant order: 2, 3, 5, 6, 4, 7. As with sub-band 8, any bits leftover from previous coding are added to the predetermined bit allocation for the current sub-band. Once again, the dead-zone quantizer on the difference signal is used to update these sub-bands. As with sub-band 1, an empirically derived minimum dead-zone threshold is imposed when coding these sub-bands. The second method uses an energy criterion which selects the highest values from the difference signal from all of the sub-bands 2-7 rather than looking at each of bands 2-7 individually.

Of the high-pass temporal sub-bands, only sub-band 8 is coded. Subbands 9, 10, and 11 are all set to zero and are not coded (as discussed above, this may be done by filterbank 300).

This embodiment employs the decoder discussed in section B.3, above, and presented in FIG. 5.

APPENDIX

A great deal of progress has been made recently in the standardization of video coding techniques both for telecommunications and multimedia applications. The basis for these standards is the motion compensated discrete cosine transform (MC-DCT). Although these techniques are efficient to implement because of their local operations and small memory requirements, their performance at low bit rates is limited by motion compensation and DCT block artifacts. For videoconferencing applications there is a significant advantage in operating at, or below, 384 kbits/s, and as low as 19.2 kbits/s.

Subband filtering provides an alternative frequency domain representation to the DCT. Vitterli [1] has shown that separable temporal and spatial quatrature mirror filters can be used to split the original signal into N subsampled subbands and to reconstruct the original signal. The subbands can be structured to take advantage of perceptual band sensitivity to hide quantization noise, allowing coarse quantization of the sparse higher frequency bands. Coding rates of 0.1 bits per pixel, and lower, have been obtained in the upper bands using vector quantization, allowing the more visible lower bands to be coded with high fidelity [2]. Subband analysis avoids the highly visible block structure and motion compensation errors of MC-DCT coders at low coding rates. Although the computational complexity of both coders is similar, storage and data movement are more complex for the subband coder due to temporal filtering and global filtering operations.

Several real-time video coding architectures have appeared recently in the literature, They include fixed algorithm architectures [3], single instruction multiple data (SIMD) architectures with shared memory [4], systolic array architectures [5], and multiple instruction multiple data (MIMD) architectures with shared memory [6]. These architectures do not provide the global data movement and local storage requirements needed to implement the three-dimensional subband coder, described above, in real-time at videoconferencing temporal and spatial resolutions. This abstract addresses the implementation of real-time three dimensional subband video coders on a MIMD programmable array processor, referred to as the Video Array Processor (VAP). The key features of this architecture include a distributed frame memory and global data bus. The distributed memory provides local frame store for the implementation of temporal and horizontal filtering. The global bus provides interprocessor communication both for transposing the data for vertical filtering, and transfer of coded and uncoded data. While directly applicable to the second embodiment of the present invention described above, one of ordinary skill in the art will appreciate that this implementation may be adapted to the other two embodiments.

Subband Coding Technique

The subband coding technique comprises of filtering the original sequence into critically sampled subbands which are quantized and transmitted to the decoder. Interband information is used to dynamically allocate bits among the subbands, and to adapt the subband quantizers to minimize visible artifacts. The decoder dequantizes and filters the received data through related filters to reconstruct the image sequence.

Subband Filters

The original video sequence is decomposed temporally and spatially using separable filters. The subband decomposition being used for videoconferencing applications (256×240) pixels at 15 frames per second) is shown in FIG. 3 of this appendix. It is found that bands 7, 9, 10, and 11 contain very low energy for typical scenes, and can be set to zero during reconstruction with little resulting degradation. The lower temporal band codes motion below half the frame rate, and contains the information for reconstructing static parts of the image sequence. Band 1 is a spatially low-passed version of the original image sequence, while the upper spatial bands code high-frequency components. These appear as sparse, egde-like images. Band 8 codes temporal frequencies above half the frame rate, and has significant energy only for moving parts of the image sequence. This band also appears sparse and edge-like.

Since separable filters are used, the decomposition into subbands is accomplished in stages as shown in FIG. 2 of this appendix. The notation Th, Tl, Hh, Hl, Vh, and Vl corresponds to temporal, horizontal, and vertical filtering into high and low bands, respectively. Since the output of each filterings stage is critically sampled, and only half of the bands are kept, the number of pixels in the resulting subbands is equal to half the number in the original sequence. It should be noted that in order to obtain the subband decomposition an entire line, or column of data must be processed, in contract to DCT-based techniques which only need a local neighborhood to compute the frequency domain representation.

Subband Quantizers

In order to achieve a low, constant coding rate while maintaining good quality, the quantizer takes advantage of temporal redundancy, subband characteristics, and perceptual masking of distortion. The subband decomposition removes spatial redundancy within the subbands, therefore, significant coding gains have not been found using spatial predictors. Temporal redundancy is removed by using conditional replenishment in the lower temporal subband. Once transmitted, static areas are repeated in subsequent frames; the areas containing repeated pixels are transmitted at low bit-rate using run-length coding. Moving segments are allocated bits according to the visibility of errors within each subband. These bits are dynamically allocated with priority first going to the lowest spatial subbands in both the high and low temporal bands. When the entropy exceeds the coding rate during high motion, the upper spatial bands are first coded at low rate using vector quantization, and with greater motion the moving areas are coded at lower spatial resolution by zeroing those areas in the upper spatial bands. Interband information is used to determine the zeroed pixels without transmitting additional side information. Scalar quantizers are used in the lower four subbands to minimize visible artifacts. The effect of these techniques is to code moving areas at higher frame rates, and to decrease the spatial resolution of moving areas when the entropy of the image sequence exceeds the coding rate. Quantization errors are thereby introduced into less visible moving areas and subbands, while slowly varying and static areas retain high resolution and minimum quantization noise.

VAP Architecture

The VAP was designed to provide a flexible, real-time, implementation of the technique described above. The video format, subband filter structure, and quantizers are fully programmed in a MIMD architecture. Video resolution up to full CCIR601 (720×485 pixels), 30 frames per second) can be processed, subject to algorithm complexity.

Vap Array

The VAP encoder comprises a video interface, a processor element (PE) array, and an interboard interface, as shown in FIG. 1 of this appendix. Data input and processor transfers occur synchronously with lines of video data, which are transmitted successively to each PE. In addition, each PE is signalled at the beginning of a sequence of fields in order to synchronize background processing which implements the coding technique. Since this provides each PE with a time-slot on the interprocessor bus, bus contention is eliminated and delay is minimized. Data and interprocessor transfers are buffered on each PE to minimize foreground I/O process overhead. The VAP decoder PE array is identical, with interfaces provided to input coded data, and to output CCIR601 video data.

The VAP encoder and decoder are each constructed on a 9U VME card, and a VME interface is provided between the host and each PE for program downloading and control. Eight PEs are included on both the encoder and decoder boards.

PE Architecture

Each PE comprises an AT&T DSP32C processor, memory, data input interface, and interprocessor interface. I/O and process synchronization are accomplished through the DSP32C interrupt lines. Host communication uses the DSP32C parallel I/O (PIO). Video and interprocessor data are communicated via the external memory interface, allowing instruction operands to be accessed directly from the I/O buffers. Interprocessor write addresses are directly mapped into the DSP32C address space, allowing data transfers at the instruction rate, therefore interprocessor transfers can be made at a sustained 50 Mbyte/second rate. Video data can be input to the data FIFO at the full CCIR601 27 Mbyte/second rate. Each PE includes 256k×32 SRAM which can be accessed at the processor execution rate of 25 MFLOPS.

The combined processing rate of the eight PE encoder and decoder which have been constructed is 400 MFLOPS, with a total external distributed memory of 16 Mbytes. In addition, each DSP32C contains six kbytes of internal static RAM.

Coder Implementation

An important consideration for teleconferencing coders is the delay experienced in coding, transmitting, and decoding the image sequence. The encoding and decoding time for subband coders is a function of the temporal filter order, and processing delay, which includes interprocessor transfers. In order to minimize the delay, a study was undertaken to determine the effect of temporal filter order on coding gain. The FIR filter order was constrained to be less than fourth order, since significant delay is introduced with higher order filters at the 15 fps rate. It was found that two tap filters provided good quantizer performance with minimum delay, therefore these were chosen for the implementation. Tenth order QMF spatial filters were used to minimize quantization effects due to interband aliasing since spatial filter order does not effect coder delay. Processing delay is minimized by load balancing across the processor array while minimizing interprocessor transfers as described below.

In order to minimize interrupt overhead while providing a small transfer latency relative to the temporal filter delay, data and interprocessor transfers occur at the CCIR601 line rate, i.e. every 69 μsec. Since there are eight PEs in each array, each PE is interrupted every 550 μsec. During the interrupt service routine, the PE performs interprocessor transforms and inputs the appropriate subsampled luminance and chrominance data. Up to 850 32-bit transfers can be performed during the line interval. The interrupt service routine also loads line and frame counters which are used to schedule background processes. The frame counter cycles through four CCIR601 frames, which corresponds to two frames at the 15 fps rate. The frame counters in all PE's are synchronized so that the temporal filters begin at the same time in all PEs.

The luminance analysis filters are distributed across the PE array as shown in FIG. 2 of this appendix. During the first field of frame 0 each PE receives a successive line of video data. Since each PE contains a local frame store, temporal filtering and the first stage of horizontal filtering can be performed without transfer of data over the interprocessor bus. In order to perform subsequent vertical filtering, the data is transposed using the interprocessor bus in the next two fields. All vertical lines corresponding to each subband are transmitted to one PE so that the following decomposition and quantization can be performed. Although PE0 has additional filtering to perform, only scalar quantization is performed on its subbands so that approximately equal loading is distributed to the PEs performing vector quantization. Subband allocation data is transmitted between PEs in a subsequent field. The process and I/O scheduling described is shown in FIG. 4 of this appendix.

The process and I/O/ scheme described above results in a coder plus decoder delay of 33 msec, including the delay due to temporal filtering. The chrominance bands are processed in a similar manner, except that only alternate PEs perform temporal and horizontal filtering due to vertical subsampling of the chrominance. Subsequent filtering and quantization are performed in Ps 4, 5, 6, and 7.

A similar process and I/O schedule is used in the decoder array, with the dequantizer and filters being executed in reverse order to reconstruct the image sequence. The decoder array also upsamples the data so that it can be output in standard CCIR601 format via the interprocessor bus.

References

1. Martin Vitterli, "Multi-dimensional Sub-Band Coding: Some Theory and Algorithms," Signal Processing 6, 1984, pp. 97–112.

2. C. I. Podilchuk, N. S. Jayant, P. Moll, "Sparse Codebooks for the Quantization of Non-dominant Sub-bands in Image Coding," IEEE International Conference on ASSP, 1990.

3. Kun-Min Yang, Didier J. LeGall, "Hardware Design of a Motion Video Decoder for 1–1.5 Mbps Rate Application," Signal Processing, Image Communication 2, 1990, pp. 117–126.

4. Cornelis Hoek, Rainer Heiss, Detlef Mueller, "An Array Processor Approach for low Rate Video Coding," Signal Processing, Image Communication 1, 1989, pp. 213–223.

5. A. J. DeGroot, E. M. Johansson, S. R. Parker, "Image Processing Using the Sprint Microprocessor," IEEE International Conference on Systems Engineering, 1989, pp. 173–176.

6. J. R. Parker, T. R. Ingoldsby, "Design and Analysis of a Multiprocessor for Image Processing," Journal of Parallel and Distributed Computing, volume 9, number 3, July 1990, pp. 297–303.

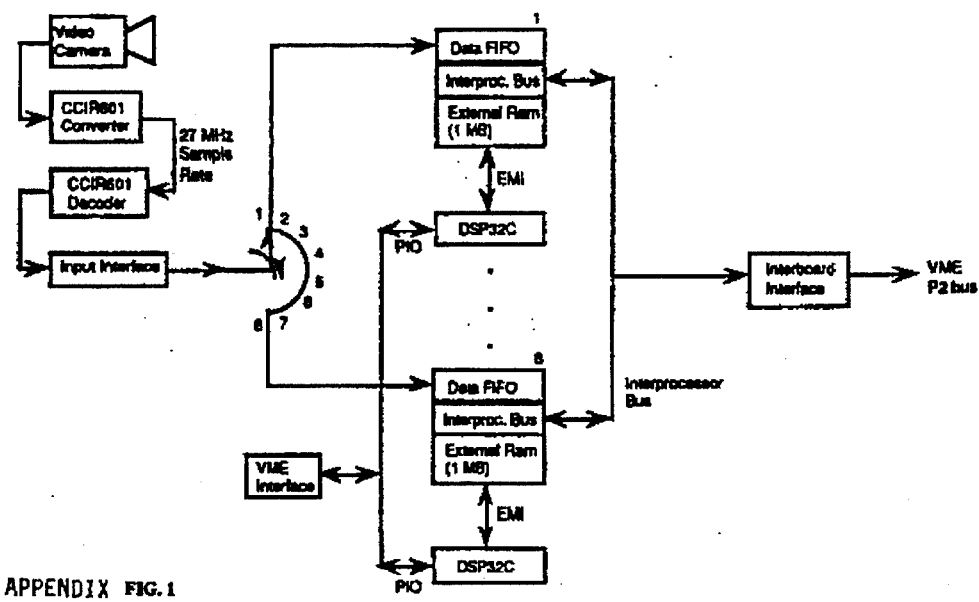
APPENDIX FIG. 1
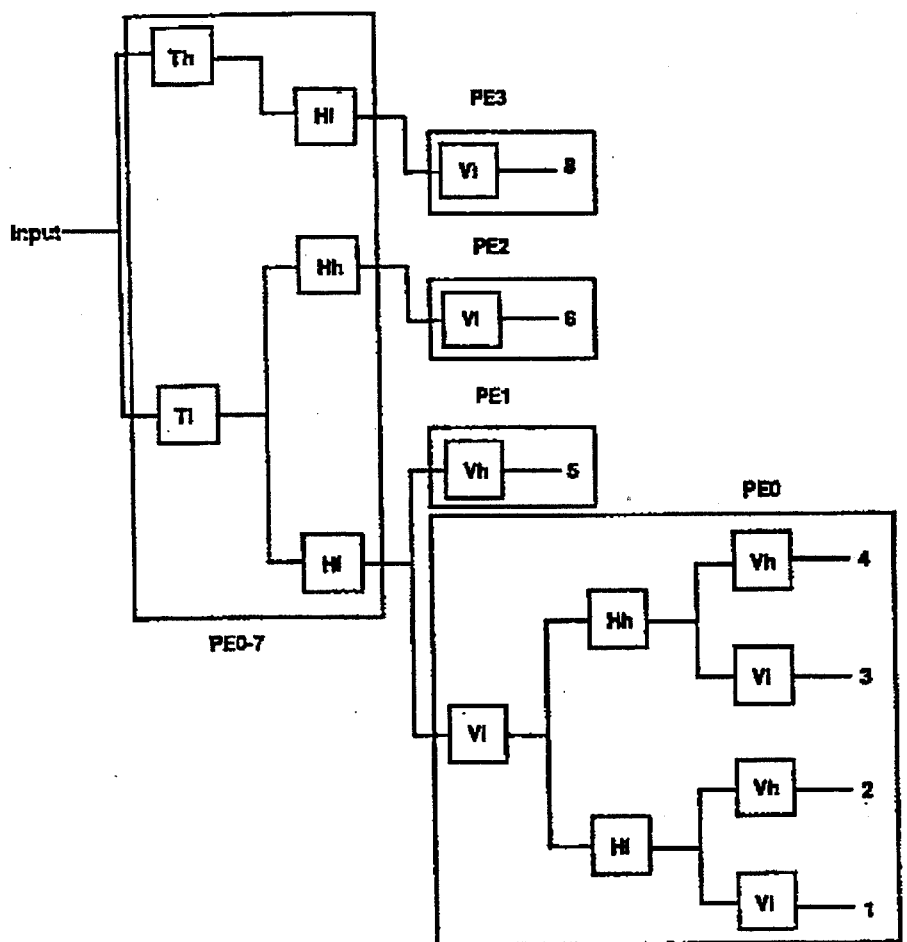
APPENDIX FIG. 2

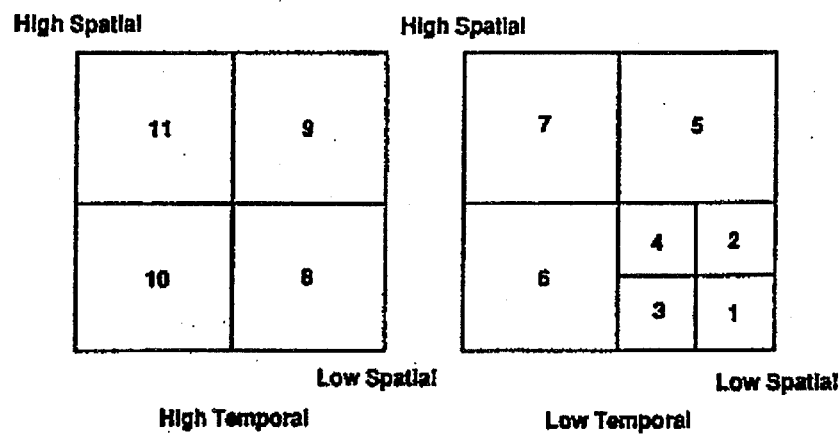
APPENDIX FIG. 3
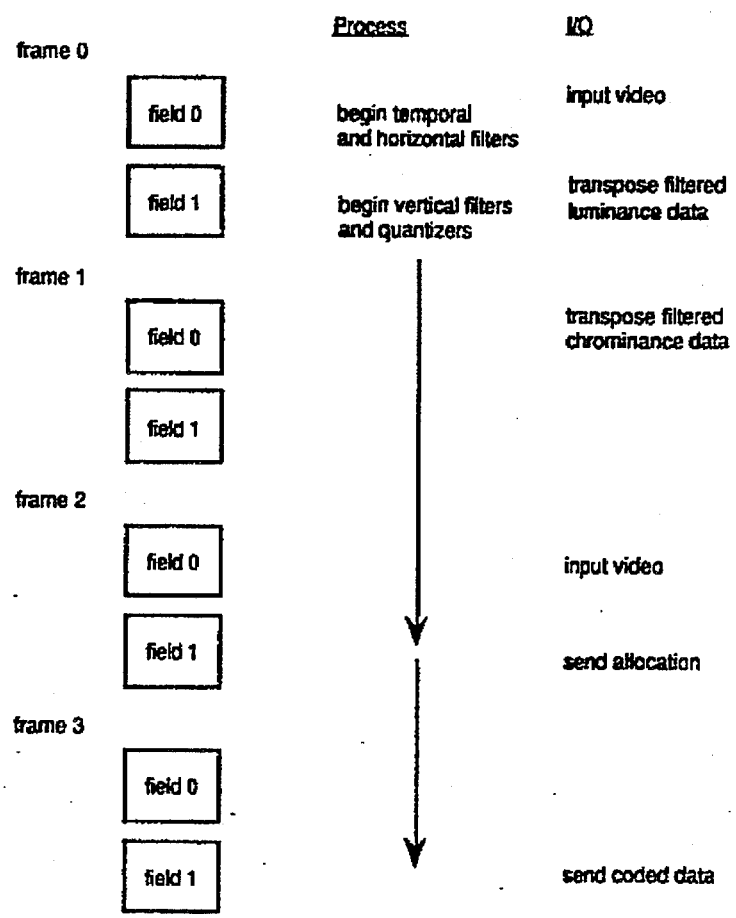
APPENDIX FIG. 4

We claim:

1. A method of synthesizing an image based on a plurality of coded sub-band image signals corresponding to a plurality of sub-bands into which an original image signal has been subdivided, the method comprising the steps of:

decoding a coded portion of a given sub-band image signal to form one or more decoded portions, said coded portion indicated by coded portion indicating signals received from a communication channel wherein the given sub-band image signal is an image signal corresponding to a given one of the plurality of coded image sub-band signals;

for a portion of given the sub-band image signal not coded, adopting a corresponding portion of a previously decoded sub-band image to form one or more adopted portions, said adopted portions identified by adopted portion identifying signals received from said communication channel;

zeroing a portion of the given sub-band image signal not decoded and not adopted to form one or more zeroed portion, said zeroed portions identified by zeroed portion identifying signals received from said communication channel;

for each of said plurality of coded sub-band image signals, forming a generated a sub-band image, where at least one the generated sub-band images is based on a combination of said one or more decoded portions, said one or more adopted portions and said one or more the zeroed portions; and synthesizing an image based on the plurality of generated sub-band images.

2. An apparatus for synthesizing an image based on a plurality of coded sub-band image signals corresponding to a plurality of sub-bands into which an original image has been subdivided, the apparatus comprising:

means for decoding a coded portion of a given sub-band image to form a decoded portions, said coded portion indicated by coded portion indicating signals received from a communication channel, wherein the given sub-band image signal is an image signal corresponding to a given one of the plurality of coded sub-band image signals;

means tier adopting a portion of a previously decoded sub-band image signal thereby forming one or more adopted portions, said adopted portions corresponding to an uncoded portion of the sub-band image, said adopted portion identified by adopted portion identifying signals received from said communication channel;

means for zeroing a portion of the given sub-band image signal not decoded and not adopted, thereby forming one or more zeroed portions, said zeroed portions identified by zeroed portion identifying signals received from said communication channel;

means for generating a sub-band image for each of said plurality of coded sub-band image signals, where at least one of the generated sub-band images is based on a combination of said one or more decoded portions, said one or more adopted portions, and said one or more zeroed portions; and means for synthesizing an image based on the generated sub-band images.

* * * * *